(12) United States Patent
Xing

(10) Patent No.: US 11,473,778 B2
(45) Date of Patent: Oct. 18, 2022

(54) HIGH-EFFICIENCY CLEAN EXCESS ENTHALPY COMBUSTION DEVICE

(71) Applicant: Xianjun Xing, Anhui (CN)

(72) Inventor: Xianjun Xing, Anhui (CN)

( * ) Notice: Subject to any disclaimer, the term of this patent is extended or adjusted under 35 U.S.C. 154(b) by 313 days.

(21) Appl. No.: 16/882,360

(22) Filed: May 22, 2020

(65) Prior Publication Data

US 2020/0309371 A1 Oct. 1, 2020

Related U.S. Application Data

(63) Continuation of application No. PCT/CN2018/117446, filed on Nov. 26, 2018.

(30) Foreign Application Priority Data

Apr. 12, 2018 (CN) .......................... 201810327097.5

(51) Int. Cl.
| | |
|---|---|
| *F23J 15/08* | (2006.01) |
| *F23M 5/00* | (2006.01) |
| *F23N 5/00* | (2006.01) |

(52) U.S. Cl.
CPC ................ *F23J 15/08* (2013.01); *F23M 5/00* (2013.01); *F23N 5/003* (2013.01); *F23M 2700/005* (2013.01)

(58) Field of Classification Search
None
See application file for complete search history.

(56) References Cited

FOREIGN PATENT DOCUMENTS

| CN | 201416913 Y | 3/2010 |
|---|---|---|
| CN | 203034054 U | 7/2013 |
| CN | 103383143 A | 11/2013 |
| CN | 104792001 A | 7/2015 |
| CN | 106322439 A | 1/2017 |
| WO | 9913270 A1 | 3/1999 |

*Primary Examiner* — Jason Lau

(57) ABSTRACT

An excess enthalpy combustion device includes a furnace body and a feed mechanism disposed on one side of the furnace body. A flue gas outlet is provided on the furnace body. A wall of the furnace body includes a refractory material layer, an electric heating layer, and an insulating layer that are arranged in sequence from inside to outside. Two horizontal first refractory partitions which are staggered in the vertical direction are provided in an upper layer of the furnace body. Four vertical second refractory partitions which are staggered in the horizontal direction are provided in a lower layer of the furnace body; a third refractory partition parallel to a side wall is provided on the other side of the furnace body opposite to a grate mechanism. The combustion device adopts an electric heater to heat the furnace body when the electric heater is powered on.

15 Claims, 4 Drawing Sheets

HIGH-EFFICIENCY CLEAN EXCESS ENTHALPY COMBUSTION DEVICE

CROSS-REFERENCE TO RELATED APPLICATIONS

This application is a continuation of International Application No. PCT/CN2018/117446 with a filling date of Nov. 26, 2018, designating the United states, now pending, and further claims to the benefit of priority from Chinese Application No. 201810327097.5 with a filing date of Apr. 12, 2018. The content of the aforementioned applications, including any intervening amendments thereto, are incorporated herein by reference.

TECHNICAL FIELD

The present application relates to combustion devices, more particularly to a high-efficiency clean excess enthalpy combustion device, which is applicable to the combustion of solid, gas or liquid fuels.

BACKGROUND

Continual and ongoing exploitation of natural resources, rapid development of urbanization and growth in living standards and urban population bring about an increasing need for resources. Meanwhile, clean combustion techniques for resources are thought to be more and more important. However, the existing combustion techniques have many disadvantages. First, the combustion efficiency needs to be improved. In the conventional incineration, the loss on ignition of cinder is 3%-5%, and the gaseous phase contains a relatively large amount of charcoal residue, which can potentially be used. Second, there is a secondary pollution problem. Because there is an uneven combustion temperature and a low average temperature during the combustion, acidic gases such as NOR, $SO_2$, etc., hydrocarbon, heavy metals, and other toxic and harmful components tend to be generated in the fume.

"Excess enthalpy combustion" refers to when the external heat loss is ignored, the flame temperature can exceed the adiabatic flame temperature corresponding to gas mixture state without preheating. Compared to the traditional combustion method, the excess enthalpy combustion has the advantages of a high thermal efficiency, high combustion efficiency, high lean flame limit (i.e., fuels with a low calorific value are combustible), high radiant output (beneficial to even, directional, contactless heating), even combustion temperature, relatively large combustion equivalence ratio, and extremely little contaminant, etc. Therefore, the application of excess enthalpy combustion technique can improve the thermal efficiency and combustion efficiency of the combustion; mostly importantly, it can inhibit the generation of harmful gases. Therefore, it is necessary to systematically study the excess enthalpy combustion process to provide reference for the combustion technique and the design of the incinerator.

The main implementation of the existing excess enthalpy combustion techniques is as follows: according to the excess enthalpy combustion principle, the heat storage material is heated using the flue gas afterheat, and then heats the air entering the furnace, so that the enthalpy inside the furnace is larger than the enthalpy of the fuel entering the furnace. When the heat storage material exchanges heat with the air, the temperature of the heat material gradually decreases. When the enthalpy inside the furnace is smaller than the enthalpy of the fuel entering the furnace, the fuel combustion is no longer in an excess enthalpy combustion state, that is, this technique cannot achieve the continuous and stable excess enthalpy combustion of the fuel in the furnace.

SUMMARY

The present application provides a high-efficiency clean excess enthalpy combustion device, so that excess enthalpy combustion of fuels is better achieved.

The present application provides a high-efficiency clean excess enthalpy combustion device, including a furnace body and a feed mechanism disposed on one side of the furnace body; a flue gas outlet is provided on the furnace body; a wall of the furnace body comprises a refractory material layer and an insulating layer that are arranged in sequence from inside to outside; at least two first refractory partitions which are horizontally arranged and staggered in a vertical direction are provided in an upper layer of the furnace body; at least one pair of second refractory partitions which are vertically arranged and staggered in the horizontal direction are provided in a lower layer of the furnace body; a third refractory partition which is vertically arranged is further provided in the furnace body; the third refractory partition is flush with an uppermost first refractory partition of the at least two first refractory partitions; an upper circulating flue is formed between the at least two first refractory partitions and between the at least two first refractory partitions and the wall of the furnace body; the upper circulating flue is communicated with the flue gas outlet; a lower circulating flue is formed between the at least one pair of second refractory partitions and between the at least one pair of second refractory partitions and the wall of the furnace body; a plurality of outlets which are symmetrically arranged are provided on the third refractory partition at a tail of the lower circulating flue to change a flow direction of flue gases from horizontal to vertical, and allow the flue gases to flow upward; a first through hole is provided on the third refractory partition at a front of the upper circulating flue; a combustion chamber for the excess enthalpy combustion is formed by a flue of the lower circulating flue that is communicated with the feed mechanism.

In an embodiment, the wall of the furnace body further comprises an electric heating layer; the refractory material layer, the electric heating layer and the insulating layer are arranged in sequence.

In an embodiment, a flue of the combustion chamber is located in a middle of the lower circulating flue.

In an embodiment, the first refractory partitions, the second refractory partitions, and the third refractory partitions are made of the same material with the refractory material layer.

In an embodiment, the electric heating layer may be in the form of any one of an electric heating wire, a resistance wire, a silicon carbide bar, a heating ring, a heating plate and a heating pipe.

In an embodiment, a gas analyzer and a temperature sensor are further mounted in the high-efficiency clean excess enthalpy combustion device.

In an embodiment, the feed mechanism is a grate mechanism.

In an embodiment, the furnace body is a boiler, a kiln, a hot blast stove or a smelting furnace.

The present application further comprises a high-efficiency clean excess enthalpy combustion device, comprising a furnace body and a feed mechanism disposed on one side of the furnace body; a flue gas outlet is provided on the furnace body; a wall of the furnace body comprises a refractory material layer, an electric heating layer and an insulating layer that are arranged in sequence from inside to outside; at least two first refractory partitions which are horizontally arranged and staggered in the vertical direction are provided in an upper layer of the furnace body; at least one pair of second refractory partitions which are vertically arranged and staggered in the horizontal direction are provided in a lower layer of the furnace body; a third refractory partition which is vertically arranged is further provided in the furnace body; the third refractory partition is flush with an uppermost first refractory partition of the at least two first refractory partitions; an upper circulating flue is formed between the at least two first refractory partitions and between the at least two first refractory partitions and the wall of the furnace body; the upper circulating flue is communicated with the flue gas outlet; a lower circulating flue is formed between the at least one pair of second refractory partitions and between the at least one pair of second refractory partitions and the wall of the furnace body; a plurality of outlets which are symmetrically arranged are provided on the third refractory partition at a tail of the lower circulating flue to change a flow direction of flue gases from horizontal to vertical and allow the flue gases to flow upward; a first through hole is provided on the third refractory partition at a front of the upper circulating flue, a combustion chamber for the excess enthalpy combustion is formed by a flue of the lower circulating flue that is communicated with the feed mechanism.

In an embodiment, a flue of the combustion chamber is located in a middle of the lower circulating flue.

In an embodiment, the at least two first refractory partitions, the at least one pair of second refractory partitions, and the third refractory partition are made of the same material as the refractory material layer.

In an embodiment, the electric heating layer may be in the form of any one of an electric heating wire, a resistance wire, a silicon carbide bar, a heating ring, a heating plate and a heating pipe.

In an embodiment, a gas analyzer and a temperature sensor are further mounted in the high-efficiency clean excess enthalpy combustion device.

In an embodiment, the feed mechanism is a grate mechanism.

In an embodiment, the furnace body is a boiler, a kiln, a hot blast stove or a smelting furnace.

The present application realizes the excess enthalpy combustion through two method. One method is to heat the refractory material layer using electricity so that the enthalpy in the combustion chamber and the refractory material layer reaches H+ΔH; when the enthalpy in the combustion chamber and the refractory material layer reaches H+ΔH, the fuel with the enthalpy of H is delivered into the combustion chamber for combustion; at this time, the enthalpy in the combustion environment for the fuel is H+ΔH, which is larger than the enthalpy H of the fuel, and thus the excess enthalpy combustion is realized. The other method is to set up a circulating flue; the hot flue gases generated during the combustion passes through the circulating flue for the heat exchange so that the enthalpy in the refractory material layer and the combustion chamber reaches H+ΔH, which can also achieve constant and stable excess enthalpy combustion. The electric heating mode and the air amount entering the combustion chamber can be controlled by the temperature changes in the combustion chamber. When the temperature in the furnace body decreases to a critical point for the excess enthalpy combustion, the electric heater is powered on to heat the air inside the furnace body, and the air amount entering the combustion chamber is decreased at the same time. When the temperature in the furnace body exceeds the preset upper temperature limit of the excess enthalpy combustion, the electric heater is powered off, and the air amount entering the combustion chamber is adjusted at the same time, so that continuous and stable excess enthalpy combustion is realized in the furnace body. When the circulating flue is adopted, given the fuel entering the furnace body is continuous and constant, the temperature inside the furnace body is kept within a certain range mainly through controlling the air amount entering the furnace body. Within this temperature range, the excess enthalpy combustion is realized in the furnace body.

DETAILED DESCRIPTION OF EMBODIMENTS

Figure 1:
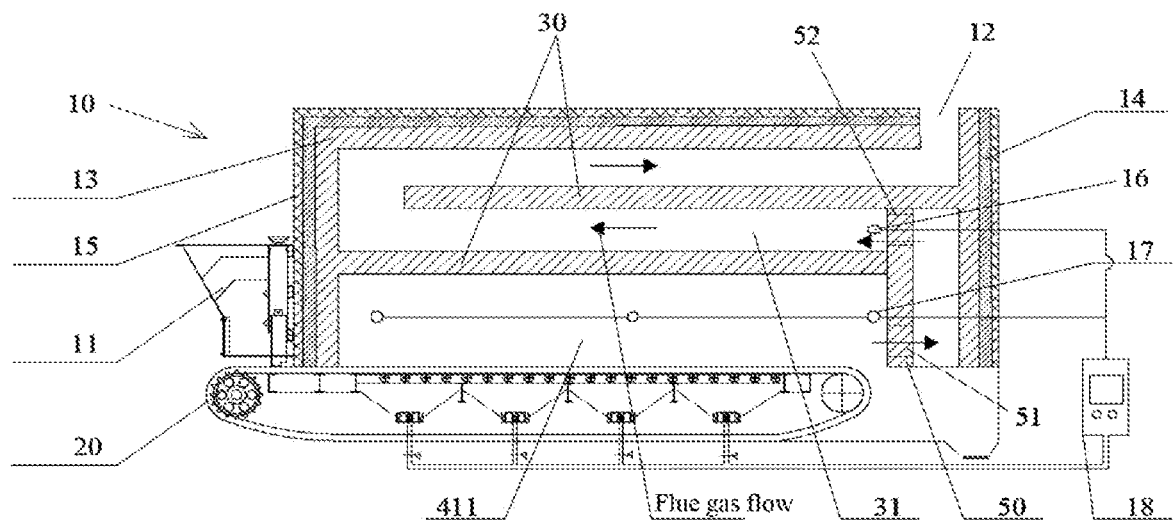
FIG. 1 is a front sectional view of a high-efficiency clean excess enthalpy combustion device according to Embodiment 1 of the disclosure.

A preferred embodiment of the present application will be further illustrated in detail below with reference to the accompanying drawings.

Illustrated is a high-efficiency clean excess enthalpy combustion device, including a furnace body 10 and a feed mechanism disposed on one side of the furnace body 10. A flue gas outlet 12 is provided on the furnace body 10. The feed mechanism can be selected from various feed mechanisms according to the type of the fuel. When the fuel of the furnace body is solids, the feed mechanism adopts a grate mechanism 20, and a feed inlet 11 of the furnace body is arranged in a lower layer of the furnace body 10. When the fuel of furnace body 10 is gases or liquids, the feed mechanism adopts a burner, and the feed inlet 11 thereof may be arranged in a middle of the furnace body 10. This embodiment is suitable for solid fuel.

The present application provides a high-efficiency clean excess enthalpy combustion device, including a furnace body 10 and a grate mechanism 20 disposed under the furnace body. A feed inlet 11 is provided at a lower layer of the furnace body 10, and a flue gas outlet 12 is provided at an upper layer of the furnace body 10. The fuel is combusted inside the furnace body 10.

The refractory material layer may be heated by electricity, so that the enthalpy in the combustion chamber and the refractory material layer reaches H+ΔH. When the enthalpy in the combustion chamber and the refractory material layer reaches H+ΔH, the fuel with the enthalpy of H is delivered into the combustion chamber for combustion; at this time, the enthalpy of the combustion environment for the fuel is H+ΔH, which is larger than the enthalpy H of the fuel, so that excess enthalpy combustion is realized. The combustion device of the present application is further provided with a circulating flue, and the hot flue gas generated during the combustion passes through the circulating flue for the heat exchange, so that the enthalpy in the refractory material layer and the combustion chamber reaches H+ΔH, which is larger than the enthalpy H of the fuel, and thus the excess enthalpy combustion is achieved more efficiently. The combustion device of the present application achieves the clean combustion. In the furnace body 10, the temperature field is even; there is no region of local high temperature; the fuel has a high combustion efficiency; and there is small amount of generated pollutant. After the fuel enters the combustion chamber, it is rapidly cracked into CO, $C_xH_yO_z$ and carbon residue, and $H_2O$ is decomposed into $H^+$ and $OH^-$, forming a mixed combustion atmosphere of the gas combustion and the solid combustion, which improves the combustion efficiency. CO, $C_xH_yO_z$, $H^+$ and $OH^-$ form a gaseous reductive combustion environment, so that there is no region of local high temperature in the furnace body 10, which effectively inhibits the generation of $NO_x$. The sulfur in the fuel reacts with sulfur fixing materials to generate a high-temperature resistant composite sulfate, which effectively inhibits the formation of $SO_x$.

Embodiment 1

Figure 2:
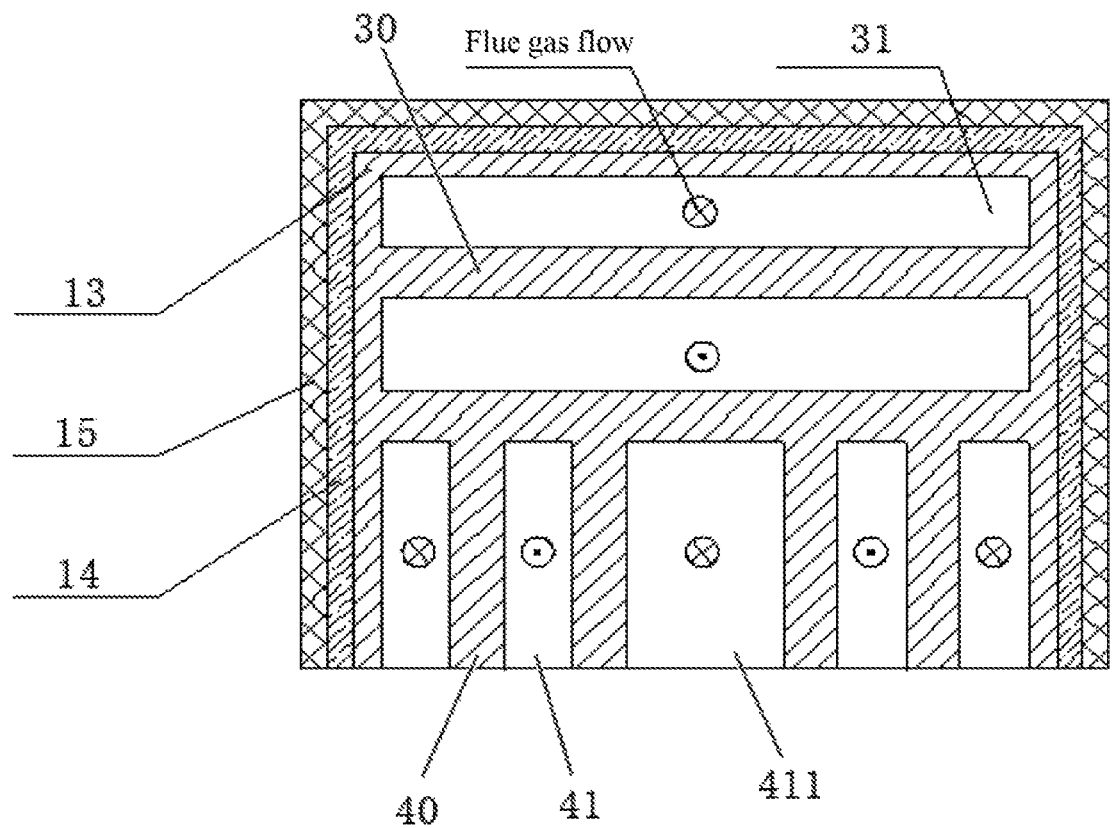
FIG. 2 is a side sectional view of the high-efficiency clean excess enthalpy combustion device according to Embodiment 1 of the disclosure, in which a grate mechanism is not shown.
Figure 3:
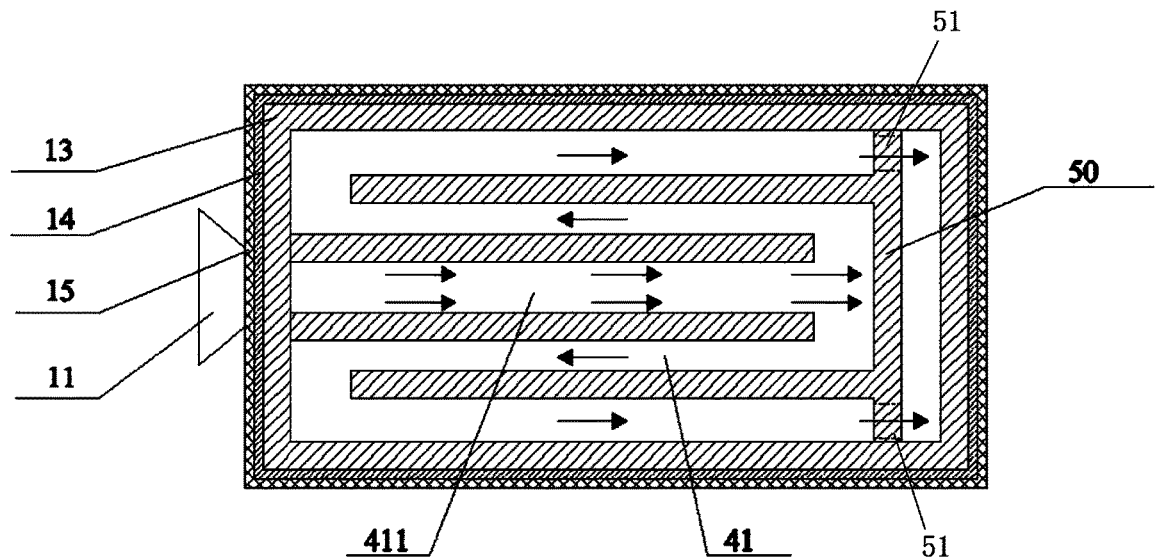
FIG. 3 is a top sectional view of the high-efficiency clean excess enthalpy combustion device according to Embodiment 1 of the disclosure.

As shown in FIGS. 1-3, a wall of the furnace body 10 comprises a refractory material layer 13, an electric heating layer 14, and an insulating layer 15 that are arranged in sequence from inside to outside.

The electric heating layer 14 is powered on to generate heat to allow the enthalpy of the combustion chamber and the refractory material layer to reach H+ΔH. When the enthalpy in the combustion chamber reaches H+ΔH, the fuel with enthalpy of H is delivered into the combustion chamber through the feed inlet 11 by the grate mechanism 20 for combustion. At this time, the enthalpy of the combustion environment for the fuel is H+ΔH, which is larger than the enthalpy H of the fuel, so that the excess enthalpy combustion is achieved.

Two first refractory partitions 30 comprising upper and lower first refractory partitions which are horizontally arranged and are staggered in a vertical direction are provided in an upper layer of the furnace body 10; four (two pairs of) second refractory partitions 40 which are vertically arranged and staggered in a horizontal direction are provided in a lower layer of the furnace body 10; and a third refractory partition 50 is arranged opposite to the grate mechanism 20 and is parallel to a side wall of the furnace body 10; a top of the third refractory partition 50 is flush with the upper first refractory partition 30. An upper circulating flue 31 is formed between the first refractory partitions 30 and between the first refractory partitions 30 and a wall of the furnace body 10. The upper circulating flue 31 is communicated with the flue gas outlet 12. A lower circulating flue 41 is formed between the second refractory partitions 40 and between the second refractory partitions 40 and the wall of the furnace body 10. A plurality of outlets 51 which are symmetrically arranged are provided on the third refractory partition at a tail of the lower circulating flue 41 to change a flow direction of the flue gas from horizontal to vertical, and allow the flue gas to flow upward, so that a vertical flue is formed on the opposite side of the grate mechanism 20. A first through hole 52 is provided on the third refractory partition at a front of the upper circulating flue 31, so that the vertical flue formed between the third refractory partition 50 and the furnace wall communicates with the upper circulating flue 31. A second through hole may also be provided on the upper first refractory partition 30 at a position close to the vertical flue; and the second through hole faces the flue gas outlet 12.

A material of the first refractory partitions 30, the second refractory partitions 40, and the third refractory partition 50 are same with that of the refractory material layer 13.

In the present application, the upper circulating flue 31 overlaps with an upper wall of the combustion chamber 411, and the lower circulating flue 41 overlaps with front and back walls of the combustion chamber 411; the hot flue gas generated during the combustion passes through the upper circulating flue 31 and the lower circulating flue 41 for heat exchange, so that the enthalpy in the refractory material layer and the combustion chamber 411 reaches H+ΔH, which is larger than the enthalpy H of the fuel, and thus the excess enthalpy combustion is realized more efficiently.

The electric heating layer 14 comprises electric heating wires; the electric heating wires are closely attached to an outer surface of the refractory material layer 13; when the electric heating layer is powered on, the electric heating wires generate heat, and the heat is transferred to the refractory material layer 13. The electric heating layer 14 may be any one of resistance wires, silicon carbide bars, heating rings, heating plates, or heating pipes.

The high-efficiency clean excess enthalpy combustion device in the present application is also provided with a gas analyzer 16 and a temperature sensor 17 which are respectively communicated with an intelligent controller 18. The gas analyzer 16 transmits data of contents of gases including $O_2$, $H_2$, $CH_4$, $CO_2$, CO, $HC_1$, $SO_2$ and $NO_x$ and other gas in the combustion chamber 411 to the intelligent controller 18. The temperature sensor 17 transmits data of combustion temperatures to the intelligent controller 18. The intelligent controller 18 processes the collected data of the contents of the gases and the combustion temperature, and sends a signal to control a valve mounted at an entrance of the feed inlet 11, thus establishing a steady combustion environment during the combustion of fuels. In this embodiment, the gas analyzer 16 is mounted in the upper circulating flue 31, and the temperature sensor 17 is mounted in the combustion chamber 411.

Embodiment 2

Figure 4:
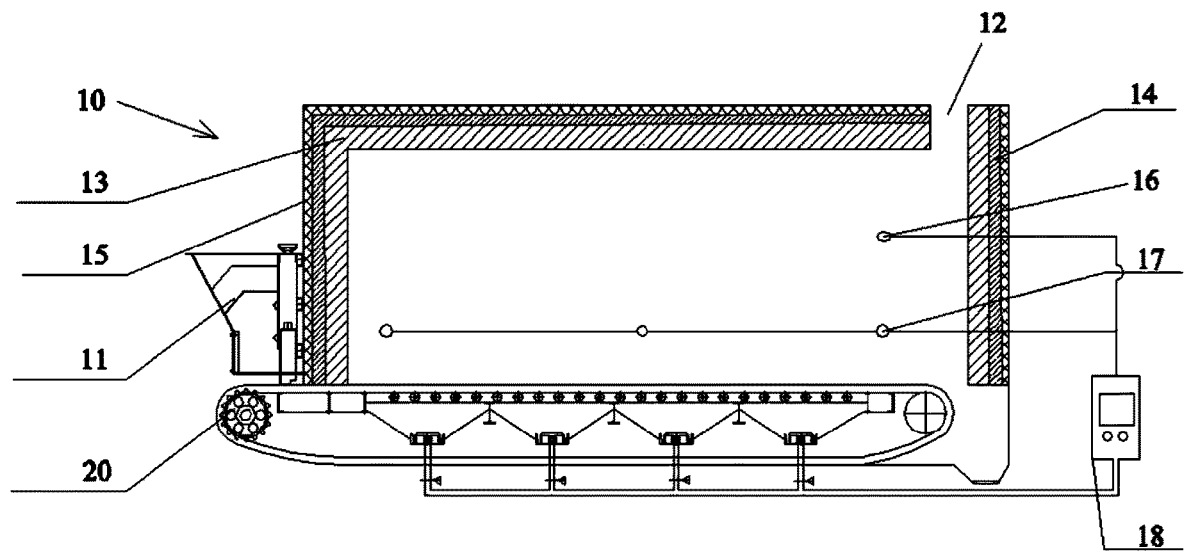
FIG. 4 is a front sectional view of a high-efficiency clean excess enthalpy combustion device according to Embodiment 2 of the disclosure.

As shown in FIG. 4, when the electric heating layer 14 is adopted, the combustion chamber is omitted. Specifically, the high-efficiency clean excess enthalpy combustion device includes a furnace body 10 and a grate mechanism 20 arranged under the furnace body 10. A feed inlet 11 is provided on one side of the furnace body, and a flue gas outlet 12 is provided on the other side of the furnace body. The wall of the furnace body 10 comprises a refractory material layer 13, an electric heating layer 14, and an insulating layer 15 that are arranged in sequence from inside to outside. An interior of the furnace body 10 forms a combustion chamber for the excess enthalpy combustion.

Embodiment 3

Figure 5:
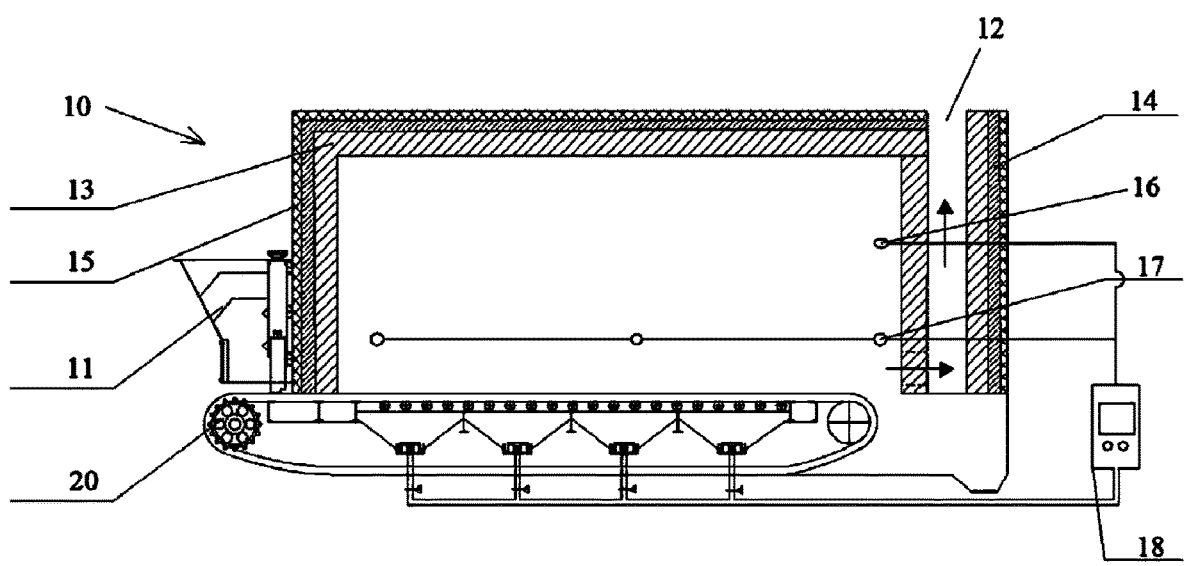
FIG. 5 is a front sectional view of a high-efficiency clean excess enthalpy combustion device according to Embodiment 3 of the disclosure.
Figure 6:
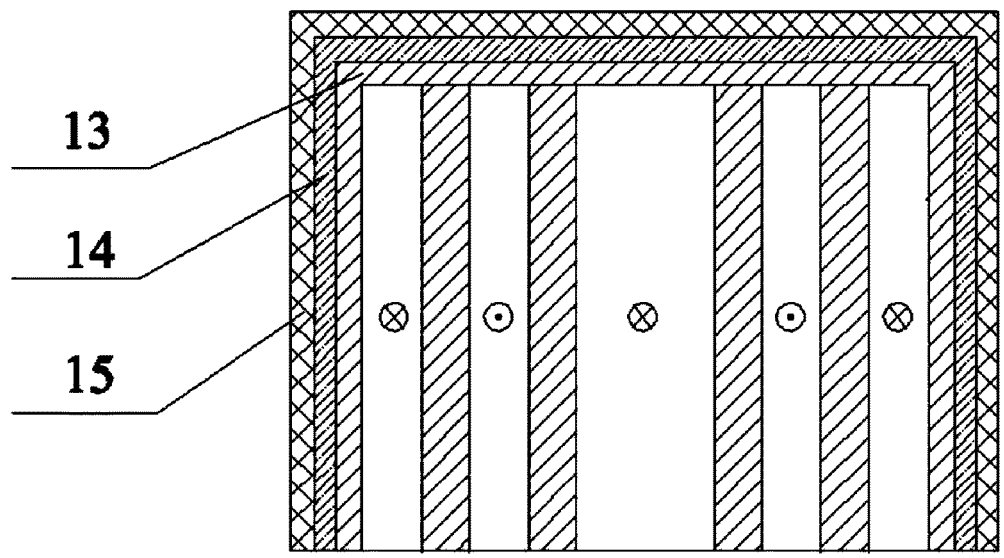
FIG. 6 is a side sectional view of the high-efficiency clean excess enthalpy combustion device according to Embodiment 3 of the disclosure, in which the grate mechanism is not shown.

Embodiment 3 is similar to the Embodiment 1 except that the two first refractory partitions 30 which are horizontally arranged and are staggered in the vertical direction are omitted, as shown in FIGS. 5 and 6.

Embodiment 4

Figure 7:
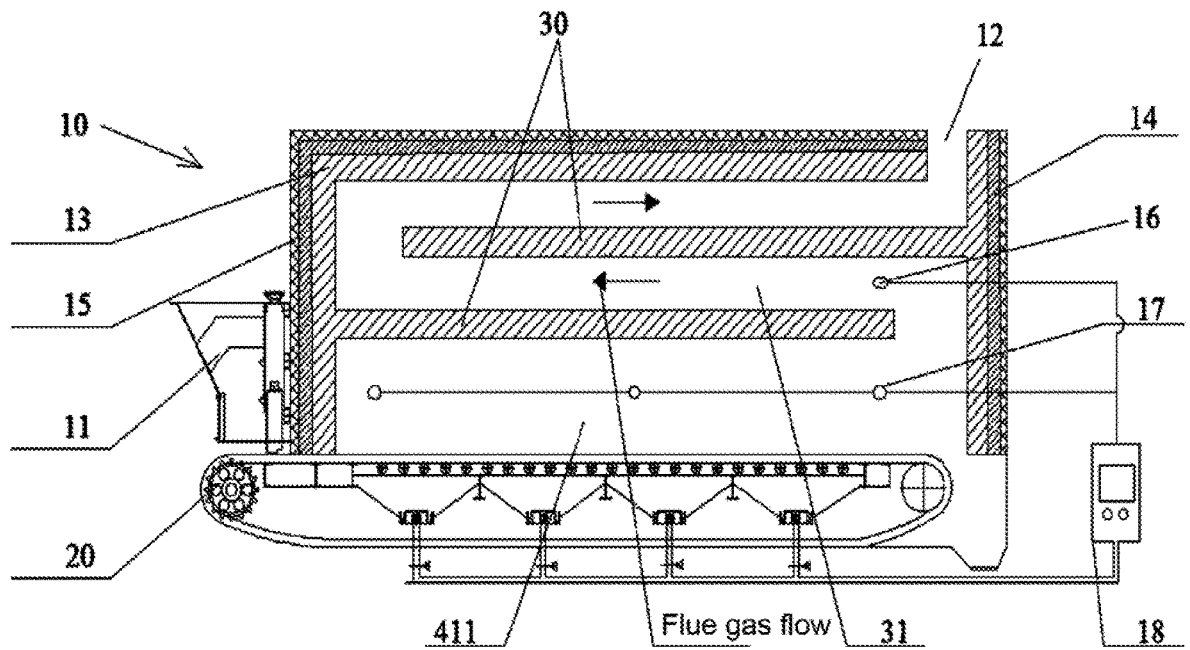
FIG. 7 is a front sectional view of a high-efficiency clean excess enthalpy combustion device according to Embodiment 4 of the disclosure.

This embodiment is similar to the Embodiment 1 except that the second refractory partitions 40 and the third refractory partition 50 are omitted, as shown in FIG. 7.

In embodiments 5-7, the electric heating layer 14 is omitted, and the first refractory partitions 30, the second refractory partitions 40 and the third refractory partition 50 are provided in the furnace body 10 to form a circulating flue to achieve the excess enthalpy combustion.

Embodiment 5

This embodiment is similar to the Embodiment 1 except that the wall of the furnace body is not provided with the electric heating layer 14.

Embodiment 6

This embodiment is similar to the Embodiment 3 except that the wall of the furnace body is not provided with the electric heating layer 14.

Embodiment 7

This embodiment is similar to the Embodiment 3 except that the wall of the furnace body is not provided with the electric heating layer 14.

Other furnace bodies, such as boilers, kiln, hot-blast stoves or smelting furnaces, can also be applied for the high-efficiency clean excess enthalpy combustion device for the excess enthalpy combustion.

Described above are merely preferred embodiments of the application, which are are not intended to limit the scope of the application. Any changes, replacements and modifications made without departing from the spirit of the application should fall within the scope of the application defined by the appended claims.

What is claimed is:

1. A high-efficiency clean excess enthalpy combustion device, comprising:
   a furnace body, and
   a feed mechanism disposed on one side of the furnace body;
   wherein a flue gas outlet is provided on the furnace body; a wall of the furnace body comprises a refractory material layer and an insulating layer that are arranged in sequence from inside to outside; at least two first refractory partitions which are horizontally arranged and staggered in a vertical direction are provided in an upper layer of the furnace body; at least one pair of second refractory partitions which are vertically arranged and staggered in a horizontal direction are provided in a lower layer of the furnace body; a third refractory partition which is vertically arranged is provided in the furnace body; and the third refractory partition is flush with an uppermost first refractory partition of the at least two first refractory partitions; an upper circulating flue is formed between the at least two first refractory partitions and between the at least two first refractory partitions and the wall of the furnace body, and is communicated with the flue gas outlet; a lower circulating flue is formed between the at least one pair of second refractory partitions and between the at least one pair of second refractory partitions and the wall of the furnace body; a plurality of outlets which are symmetrically arranged are provided on the third refractory partition at a tail of the lower circulating flue to change a flow direction of flue gases from horizontal to vertical and allow the flue gases to flow upward; and a first through hole is provided on the third refractory partition at a front of the upper circulating flue, and a combustion chamber for excess enthalpy combustion is formed by a flue of the lower circulating flue that is communicated with the feed mechanism.

2. The high-efficiency clean excess enthalpy combustion device of claim 1, wherein the wall of the furnace body further comprises an electric heating layer; and the refractory material layer, the electric heating layer and the insulating layer are arranged in sequence.

3. The high-efficiency clean excess enthalpy combustion device of claim 1, wherein a flue of the combustion chamber is located in a middle of the lower circulating flue.

4. The high-efficiency clean excess enthalpy combustion device of claim 1, wherein the at least two first refractory partitions, the at least one pair of second refractory partitions and the third refractory partition are made of the same material as the refractory material layer.

5. The high-efficiency clean excess enthalpy combustion device of claim 1, wherein the electric heating layer is in the form of any one of an electric heating wire, a resistance wire, a silicon carbide bar, a heating ring, a heating plate and a heating pipe.

6. The high-efficiency clean excess enthalpy combustion device of claim 1, wherein a gas analyzer and a temperature sensor are further provided in the high-efficiency clean excess enthalpy combustion device.

7. The high-efficiency clean excess enthalpy combustion device of claim 1, wherein the feed mechanism is a grate mechanism.

8. The high-efficiency clean excess enthalpy combustion device of claim 1, wherein the furnace body is a boiler, a kiln, a hot blast stove or a smelting furnace.

9. A high-efficiency clean excess enthalpy combustion device, comprising:
   a furnace body, and
   a feed mechanism disposed on one side of the furnace body;
   wherein a flue gas outlet is provided on the furnace body; a wall of the furnace body comprises a refractory material layer, an electric heating layer and an insulating layer that are arranged in sequence from inside to outside; at least two first refractory partitions which are horizontally arranged and are staggered in a vertical direction are provided in an upper layer of the furnace body; at least one pair of second refractory partitions which are vertically arranged and are staggered in a horizontal direction are provided in a lower layer of the furnace body; a third refractory partition which is vertically arranged is provided in the furnace body; the third refractory partition is flush with an uppermost refractory partition of the at least two first refractory partitions;

an upper circulating flue is formed between the at least two first refractory partitions and between the at least two first refractory partitions and the wall of the furnace body; the upper circulating flue is communicated with the flue gas outlet; a lower circulating flue is formed between the at least one pair of second refractory partitions and between the at least one pair of second refractory partitions and the wall of the furnace body; a plurality of outlets which are symmetrically arranged are provided on the third refractory partition at a tail of the lower circulating flue to change a flow direction of flue gases from horizontal to vertical, and allow the flue gases to flow upward; and a first through hole is provided on the third refractory partition at a front of the upper circulating flue; and a combustion chamber for excess enthalpy combustion is formed by a flue of the lower circulating flue that is communicated with the feed mechanism.

10. The high-efficiency clean excess enthalpy combustion device of claim 9, wherein a flue of the combustion chamber is located in a middle of the lower circulating flue.

11. The high-efficiency clean excess enthalpy combustion device of claim 9, wherein the at least two first refractory partitions, the at least one pair of second refractory partitions, and the third refractory partition are made of the same material as the refractory material layer.

12. The high-efficiency clean excess enthalpy combustion device of claim 9, wherein the electric heating layer is in the form of any one of an electric heating wire, a resistance wire, a silicon carbide bar, a heating ring, a heating plate and a heating pipe.

13. The high-efficiency clean excess enthalpy combustion device of claim 9, wherein a gas analyzer and a temperature sensor are further provided in the high-efficiency clean excess enthalpy combustion device.

14. The high-efficiency clean excess enthalpy combustion device of claim 9, wherein the feed mechanism is a grate mechanism.

15. The high-efficiency clean excess enthalpy combustion device of claim 9, wherein the furnace body is a boiler, a kiln, a hot blast stove or a smelting furnace.

\* \* \* \* \*